US009384054B2

(12) United States Patent  (10) Patent No.: US 9,384,054 B2
Uola et al.  (45) Date of Patent: Jul. 5, 2016

(54) PROCESS ALLOCATION TO APPLICATIONS EXECUTING ON A MOBILE DEVICE

(75) Inventors: Juha Tapani Uola, Tampere (FI); Johan Rainersson Wikman, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 1462 days.

(21) Appl. No.: 12/888,246

(22) Filed: Sep. 22, 2010

(65) Prior Publication Data

US 2012/0072913 A1  Mar. 22, 2012

(51) Int. Cl.
*G06F 9/46* (2006.01)
*G06F 9/50* (2006.01)
*G06F 9/455* (2006.01)
*G06F 9/445* (2006.01)

(52) U.S. Cl.
CPC .............. *G06F 9/5033* (2013.01); *G06F 9/445* (2013.01); *G06F 9/455* (2013.01); *G06F 9/46* (2013.01); *G06F 2209/5014* (2013.01); *G06F 2209/5018* (2013.01)

(58) Field of Classification Search
CPC ........... G06F 9/50; G06F 9/455; G06F 9/445; G06F 8/30; H04L 41/5016
See application file for complete search history.

(56) References Cited

U.S. PATENT DOCUMENTS

| | | | |
|---|---|---|---|
| 7,162,711 B2 | 1/2007 | Czajkowski et al. | |
| 7,165,251 B2 | 1/2007 | Kuroda et al. | |
| 7,325,233 B2* | 1/2008 | Kuck et al. | 718/103 |
| 7,430,741 B2* | 9/2008 | Ayachitula et al. | 718/104 |
| 7,770,181 B2 | 8/2010 | Snover et al. | |
| 7,921,365 B2 | 4/2011 | Sauve et al. | |
| 8,301,772 B2* | 10/2012 | Zeis et al. | 709/226 |
| 2004/0093562 A1 | 5/2004 | Diorio et al. | |
| 2004/0174391 A1 | 9/2004 | Keohane et al. | |
| 2005/0022157 A1* | 1/2005 | Brendle et al. | 717/104 |
| 2005/0165881 A1* | 7/2005 | Brooks | G06F 9/5027 709/200 |
| 2006/0184537 A1 | 8/2006 | Sauve et al. | |
| 2008/0229319 A1* | 9/2008 | Marchand | G06F 9/4856 718/104 |
| 2009/0235200 A1 | 9/2009 | Deutsch et al. | |
| 2009/0313620 A1* | 12/2009 | Sedukhin et al. | 718/1 |
| 2010/0131959 A1* | 5/2010 | Spiers | G06F 9/50 718/105 |
| 2011/0161828 A1 | 6/2011 | Sauve et al. | |
| 2012/0054756 A1* | 3/2012 | Arnold et al. | 718/102 |

FOREIGN PATENT DOCUMENTS

EP  2224351 A1  9/2010
WO  WO 2010/097320 A1  9/2010

OTHER PUBLICATIONS

Reis et al. ("isolating web programs in modern browser Architectures", ACM, Apr. 2009, pp. 219.*
Ian Lumb ("Google Chrome for Linux: the V8 Javascript Engine", Bright hub, Dec. 16, 2008, pp. 1-2).*

(Continued)

*Primary Examiner* — Abdullah Al Kawsar
*Assistant Examiner* — Caroline H Arcos
(74) *Attorney, Agent, or Firm* — Alston & Bird LLP

(57) ABSTRACT

An approach is provided for managing processes for enabling execution of applications within a user device. One or more characteristics of an application are determined by a process monitor module. A process management module then determines a process of the device for execution the application based, at least in part, on the one or more characteristics. A process allocation policy is executed for enabling process allocation decisions.

14 Claims, 9 Drawing Sheets

(56) References Cited

OTHER PUBLICATIONS

Brett Hill ("serving the web configuring application pools in IIS 6.0.", TechNet magazine, Jan.-Feb. 2006, pp. 1-5).*
SUN ("The java language environment", Oracle technology network, 1997, pp. 1-2).*
Meier et al. ("Improving .Net performance and scalability", Microsoft, May 2004, pp. 1-25).*
International Search Report for related International Patent Application No. PCT/IB2011/054148 dated Feb. 6, 2012, pp. 1-6.
International Written Opinion for related International Patent Application No. PCT/IB2011/054118 dated Feb. 6, 2012, pp. 1-7.
Wang et al., "SafeFox: a Safe Lightweight Virtual Browsing Environment", Center for Secure Information Systems, George Mason University, Proceedings of the 43rd Hawaii International Conferece on System Sciences, 2010, pp. 1-10.
What is the Scope of Finalizer Thread—Per Application Domain or Per Process?, accessed on: May 24, 2011, pp. 1-3, http://stackoverflow.com/questions/241537/what-is-the-scope-of-finalizer-thread-per-application-domain-or-per-process.
Google Chrome, Sep. 2, 2008, en.wikipedia.org/wiki/Google_chrome, pp. 1-22.
The Chromium Projects, accessed on: Nov. 15, 2010, dev.chromium.org/developers/design-documents/process-models, pp. 1-5.
The Multi-Principal OS Construction of the Gazelle Web Browser, Wang et al., accessed on: Nov. 15, 2010, research.microsoft.com/pubs/79655/gazelle.pdf, pp. 1-20.
The Security Architecture of the Chromium Browser, Barth et al., accessed on Nov. 15, 2010, adambarth.com/papers/2008/barth-jackson-reis.pdf, pp. 1-10.
WebKit2—WebKit, accessed on: Nov. 15, 2010, trac.webkit.org/wiki/WebKit2, pp. 1-5.
WebOS, accessed on: Nov. 15, 2010, wikipedia.org/wiki/WebOS, pp. 1-9.

\* cited by examiner

| App ID | Permissions | Complexity | Relations | Application Use Frequency | Importance |
|---|---|---|---|---|---|
| 1 | --Sensor access<br>--Allow RAM usage up to ___ blocks | High (multi-process) | APP #1<br>APP #n | 2 | 1 |
| ... | | | | | |
| n | --Allow data override | Low | | | 3 |
| ... | | | | | |
| z | --Allow RAM usage up to n blocks | Low | | | 2 |

| Policy # | Policy Name | Policy Execution Logic | Priority | Application |
|---|---|---|---|---|
| 1 | Common Domain Name Grouping | If APP #1 and #4 share a common trust domain, run in same process; otherwise, separate processes | 1 | APP ID #1 |
|   |   |   |   | APP ID #4 |
| ... |   |   |   |   |
| n | Application Migration |   |   | APP ID #10 |
|   |   |   |   | APP ID #3 |
| ... |   |   |   |   |
| z | Manual Entry | If [condition], Then [perform process allocation], Otherwise [perform other process allocation] |   | APP ID #n |

313  315  317  319  321

406

400

500

530

PROCESS ALLOCATION TO APPLICATIONS EXECUTING ON A MOBILE DEVICE

BACKGROUND

Manufacturers of wireless communication devices such as mobile phones, Smartphone's and other portable devices are continually challenged to deliver value and convenience to consumers by, for example, providing compelling network services that are accessible from the device. Increasingly, these network services allow users to readily access vast libraries of online and offline information resources, including web pages, online databases, local databases, services, applications, media content, social networks, etc. Typically, device users may need to access multiple information resources at a time by way of a browser or web portal application installed on the device. For example, the user may need to view content provided by multiple different websites, requiring they launch multiple instances of a browser for accessing each site. In other instances, they may launch multiple tabs within a single browser for accessing the various information sources. Once launched, the user can toggle between the active browsers or tabs to review the desired information. Unfortunately, memory and processing resources of the device are drained when multiple browsers or tabs are open, especially when executing data and process intensive tasks such as web applications. An alternative approach is to execute several web applications in a single process (e.g., parallel or concurrent processing). However, when one of the many open applications crash or fail during execution of the process, the other applications in execution by way of that single process are also terminated.

SOME EXAMPLE EMBODIMENTS

Therefore, there is a need for an approach to managing processes for enabling execution of applications within a user device.

According to one embodiment, a method comprises determining one or more characteristics of an application. The method also comprises determining a process of the device for executing the application based, at least in part, on the one or more characteristics.

According to another embodiment, an apparatus comprises at least one processor, and at least one memory including computer program code, the at least one memory and the computer program code configured to, with the at least one processor, cause, at least in part, the apparatus to determine one or more characteristics of an application. The apparatus is also caused to determine a process of the device for executing the application based, at least in part, on the one or more characteristics.

According to another embodiment, a computer-readable storage medium carries one or more sequences of one or more instructions which, when executed by one or more processors, cause, at least in part, an apparatus to determine one or more characteristics of an application. The apparatus is also caused to determine a process of the device for executing the application based, at least in part, on the one or more characteristics.

According to another embodiment, an apparatus comprises means for determining one or more characteristics of an application. The apparatus also comprises means for determining a process of the device for executing the application based, at least in part, on the one or more characteristics.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 3A is a diagram of a data structure representative of application characteristic data for enabling execution of applications within a user device, according to one embodiment;

FIG. 3B is a diagram of a data structure representative of policies for enabling execution of applications within a user device, according to one embodiment;

DESCRIPTION OF SOME EMBODIMENTS

Examples of a method, apparatus, and computer program for managing processes for enabling execution of applications within a user device are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention. Although various embodiments are described with respect to user devices such as mobile phones, Smartphones, computing devices, etc., it is contemplated the approach described herein may be used with other communication devices.

Figure 1:
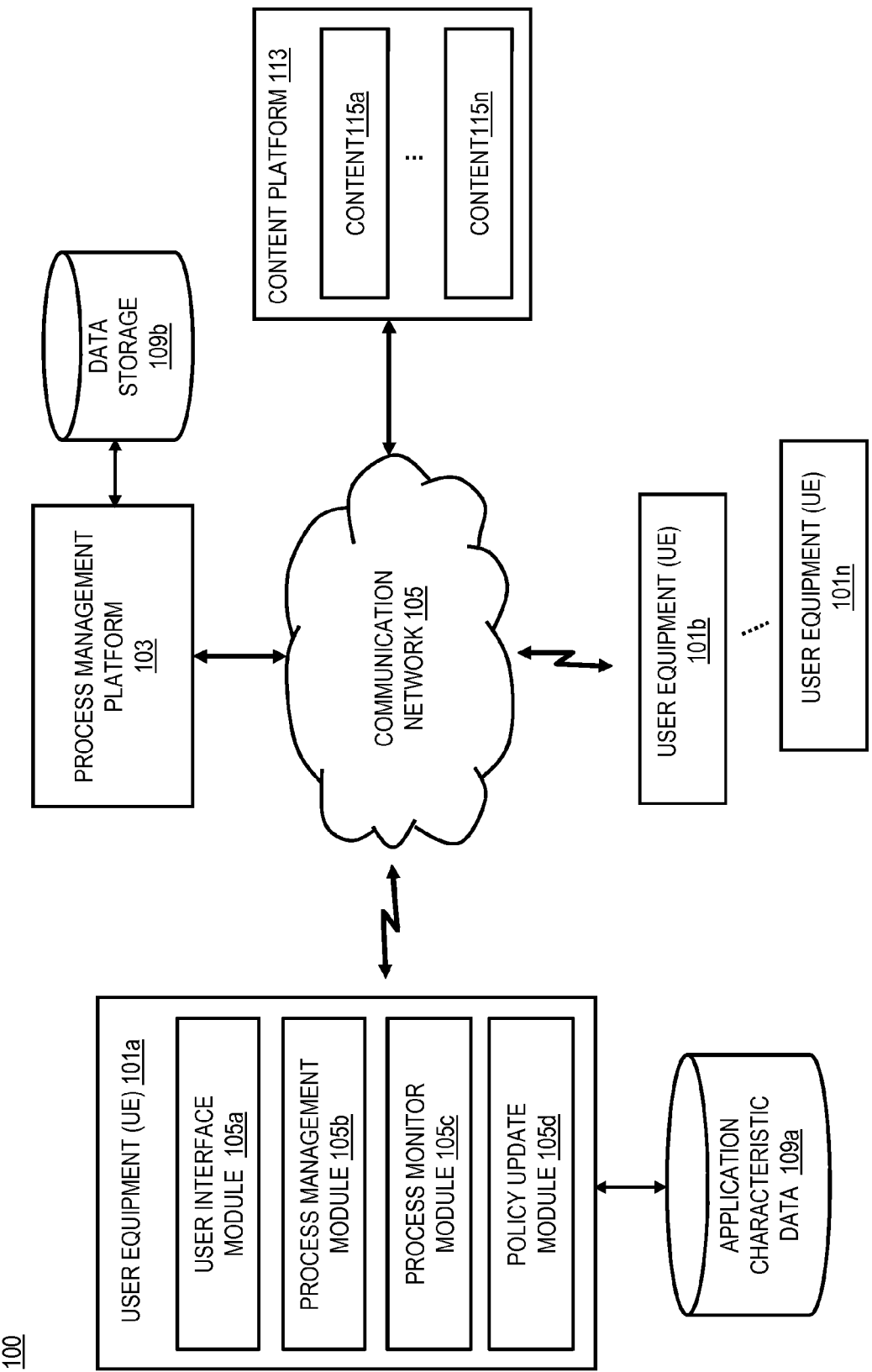
FIG. 1 is a diagram of a system capable of managing processes for enabling execution of applications within a user device, according to one embodiment.

FIG. 1 is a diagram of a system capable of managing processes for enabling execution of applications within a user device, according to one embodiment. By way of example, the system 100 enables user devices, namely user equipment (UE) 101a-101n, to optimize the execution and allocation of processes within the UE 101a-101n. Today's UEs are used to perform various processing tasks, including accessing the Web for information gathering, reserving a library book, placing an order for the purchase of an item and searching for a low price for a good or service. Typically, UEs 101a-101n feature browsers or web portal applications that enable the download or execution of content by way of a communication network, thus enabling the performance of the exemplary processing tasks described above and much more. In certain embodiments, "content" refers to any information or data that may be viewed, executed, manipulated or rendered by a browser or web portal application for fulfilling specific tasks. Content may include video, audio, internet data, data files, streaming media, object code, images, contextual and semantic data, textual data, etc. Generally, the content 115a-115n in its myriad of forms is provided to users over the communication network 105 by way of a content platform (e.g., a specific website, internet server, file server).

The browser or web portal application facilitates the viewing, execution, manipulation or rendering of content by managing the various operating system (OS) processes that are created when the user performs various browsing actions. These actions may include, by way of example, typing a URL to access a specific content source location, clicking an embedded link for invoking an e-mail editor to send an e-mail, pressing the back or forward button to recall or advance content, manipulating the buttons of a web or script based streaming media player, etc. Each of these actions are executed as one or more "processes," which in certain embodiments, pertains to an instance of execution of one or more instructions of a computing device or application thereof. Depending on the operating system (OS), a process may be made up of multiple threads of execution that execute instructions to be carried out concurrently. With respect to a browser, web portal application or the like, concurrently open websites are typically presented as tabs, allowing the user to easily toggle between varying content 115a-115n within the same browser window. The browser application may decide to run each tab in its own OS process, run all tabs in a single OS process, etc.

Creating a new process for each website or content source increases robustness because the OS takes care of isolating respective processes. By isolating processes, when one process crashes it does not affect the other processes in operation concurrently. However, as a consequence, each new process consumes resources, especially memory, of the UE 101a-101n. This is especially problematic for web applications because a large part of the browser application code needs to be duplicated for each process allocated by the OS. The overhead and resource taxation incurred by a typical UE 101a-101n for executing web-technologies on a process per application basis can be in the range of 3-7 MB. Some browser applications may even consume up to 20 MB of RAM just by being launched, before any URL has been specified and loaded. Hence, this drain on resources is especially problematic for desktop computers and critical for mobile devices and other portable wireless communication devices having smaller resource capacity. An alternative approach is to run several applications for enabling content 115a-115n in a single process, which leads to less overhead per application. However, an application crash may result in process termination, in turn effectively terminating all the other applications in the same process as well.

To address this problem, system 100 of FIG. 1 comprises a user equipment (UE) 101 having connectivity to a process management platform 103 via a communication network 105. By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

In one embodiment, UE 101a-101n includes one or more components for managing and allocating processes for executing applications. By way of example, the components operate to enable management of processes of the UE 101 based on application characteristic data 109a that specifies the logical rules and executions (e.g., policies) to be engaged by the UE 101 relative to the one or determined characteristics of the applications. Still further, various components of the UE 101 coordinate the sharing of resource usage data with a process management platform 103 and receives feedback from the platform 103 that enables it to apply the policies based on analysis of resource information. The resource information specifies data pertaining to the usage of various resources by the one or more UEs 101a-101n. For the one or more components of the UE 101, it is contemplated their functions may be combined in one or more components or performed by other components of equivalent functionality. In one embodiment, UE 101a includes a user interface module 105a, a process management module 105b, a process monitor module 105c and a policy update module 105d.

In certain embodiments, the user interface module 105a enables a browser application, web portal application, or the like to be rendered to a display of a given UE 101a-101n for enabling a user to access a content platform 113. The content platform 113 may be any source available by way of a network or communication channel for generating, maintaining or publishing content 115a-115n. The user interface module 105a, by way of example, enables presentment and navigation of content made available by the content platform 113. Navigation and presentment of content is facilitated by way of a uniform resource locator (URL) entry field or through the accessing of various embedded links. In addition, the user interface module 105a is configured to enable execution of content as various web applications (e.g., the starting and stopping of web applications), scripts, executable objects and the like for supporting various types of web-based or network based interactions. To enable concurrent access to content, the browser or web portal application supported by the user interface module 105a may provide for the multiple frames, windows or tabs to be presented to the UE 101a-101n display accordingly, relative to particular device configurations, modes of operation, screen size availability, etc. As will be discussed, such characteristics, pertaining to both the device capabilities and/or the application being executed may be considered and accounted for by a processing management platform 104 in generating customized content to be rendered to a display of the respective UE 101 via the user interface module 105a.

In one embodiment, a process management module 105b decides which applications (e.g., web applications) run in which processes based on the determined characteristics of the application or the UE 101 upon which it runs. By way of example, the characteristics include one or more security properties, one or more authentication properties, one or more permissions, frequency of use, resources used, importance, or a combination thereof. In one embodiment, the characteristics are identified and provided by one or more servers that host the respective applications. In addition or alternatively, the characteristics may be determined at the UE 101 based on, for instance, the resources, permissions, etc. requested by the applications. In addition, the process management module 105b allows process management to take place not only during web application start-up, but also when a web application is actively running. This is referred to as application migration, which permits an application to be transferred from one process to another. Suspension support is enabled for the application by the process management module 105b to enable a completely transparent end-user experience.

By way of example, the process management module 105b operates deterministically, taking the information from the user interface module 105a, application characteristic data 109a and the process monitor module 105c into account for executing process allocation decisions. Examples of decisions accounted for by the process management module 105b, considered for the purpose of affecting proper allocation of processes or execution of applications relative to known application characteristic data 109a, include:

Consideration of when a web application is started: Does the application get its own process or is it started in an already existing process? What is the permission set that needs to be given to a process (this is done in close cooperation with the system security management controls)?

Consideration of when a web application is running: Should the application continue running in its current process or should it be migrated to another (existing or new) process?

It is noted that the web application operable in connection with the user interface module 105a may provide application URL and notification about application lifecycle events (e.g., application start, stop or suspend) to the process management module 105b.

By way of example, when the user first navigates to an unknown website, corresponding to the starting of an unknown web application, process allocation policy data 109a relative to this site (application) does not yet exist and a designated default action as specified in the policy data 109a needs to be taken. An exemplary default action may be to start the application in its own process. One advantage to this approach is that running in a separate process allows the process monitor module 105c, operating in connection with the process management module 105b, to observe application behavior and memory usage (e.g., using OS memory usage mechanisms). As another advantage, running the application in its own process provides isolation in instances where the unknown application is malicious in nature.

In one embodiment, the process monitor module 105c gathers information about the state of the UE 101 operating system and running web applications. System and application state, interaction and functional information is immediately available to the process management module 105b; the process management module featuring various functions for interacting with the OS, interacting with the application programming interface (API), accessing execution threads, etc. By way of example, system information acquired and interpreted by the process monitor module 105c includes:

Data indicative of how much system resources, such as free RAM memory, are currently available;

Data indicative of how many processes are currently allocated and how much RAM memory each process is currently consuming.

In addition to the system related information, the process monitor module 105c monitors and gathers information about any running web applications, including:

Data specifying how frequently the application is used (e.g., as received from the web application via the process management module 105b);

Data indicative of how much resources the web application has consumed (e.g., based on first time execution and possibly subsequent executions)

Upon collecting the data pertaining to the application in question, the process monitor module 105c provides the data to the process management platform 103. In addition, the process monitor module 105c provides the data regarding the UE 101 upon which the application was run. Data provided may also include metadata for specifying various details regarding the application, including application name, version or build numbers, execution or error codes, process sequences, etc. Likewise, metadata associated with the UE or operating system may include OS version numbers, hardware builds or status information, processor or controller details, model numbers, etc. Any data useful for characterizing the application or device (e.g., UE 101) or for detailing the resource usage of the device or application may be gathered and subsequently reported by the process monitor module 105c.

It is noted that the process monitor module 105c is configured to monitor, intercept or interpret any information useful for specifying the current operational, functional or statistical state of the UE 101 or applications running thereon. Still further, it is noted that to the extent multiple UE 101a-101n are configured with a process monitor module 105c, the process management platform 103 is able to gather a wide set of data regarding the various operations and interactions of differing devices and applications. As will be seen later, a wealth of information of this nature is useful for continually developing refined process allocation policies that are responsive to real world conditions and for enabling enhanced process allocation decisions to be made.

In one embodiment, a policy update module 105d updates both the process allocation data maintained by the UE 101a and that maintained by the process management platform 103 based on the information collected by the process monitor module 105c. By way of example, the policy update module 105d is notified if new application characteristic data 109a is available at the process management platform 103. The update process, wherein the process management platform 103 provides process allocation policy 109a to the UE 101a, may be performed at a various levels of frequency, e.g. once per day. It is noted that in certain implementations, the communication between the UE 101 and process management platform 103 is piggybacked during other information exchanges that occur between them.

Of note, the above described modules 105b-105d interact to support the UE's 101 ability to manage applications, including performing process migration relative to policy data. When executed in combination, the various modules enable UEs 101 to more effectively balance usage of resources during execution of web applications. It will be seen further, with respect to the functions of the process management platform 103, that the modules 105b-105 also support the execution of optimized content to the display of the UE 101 via the user interface module 105a.

Communication is facilitated between the UE 101, process management platform 103, content platform 113 via the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

Figure 2:
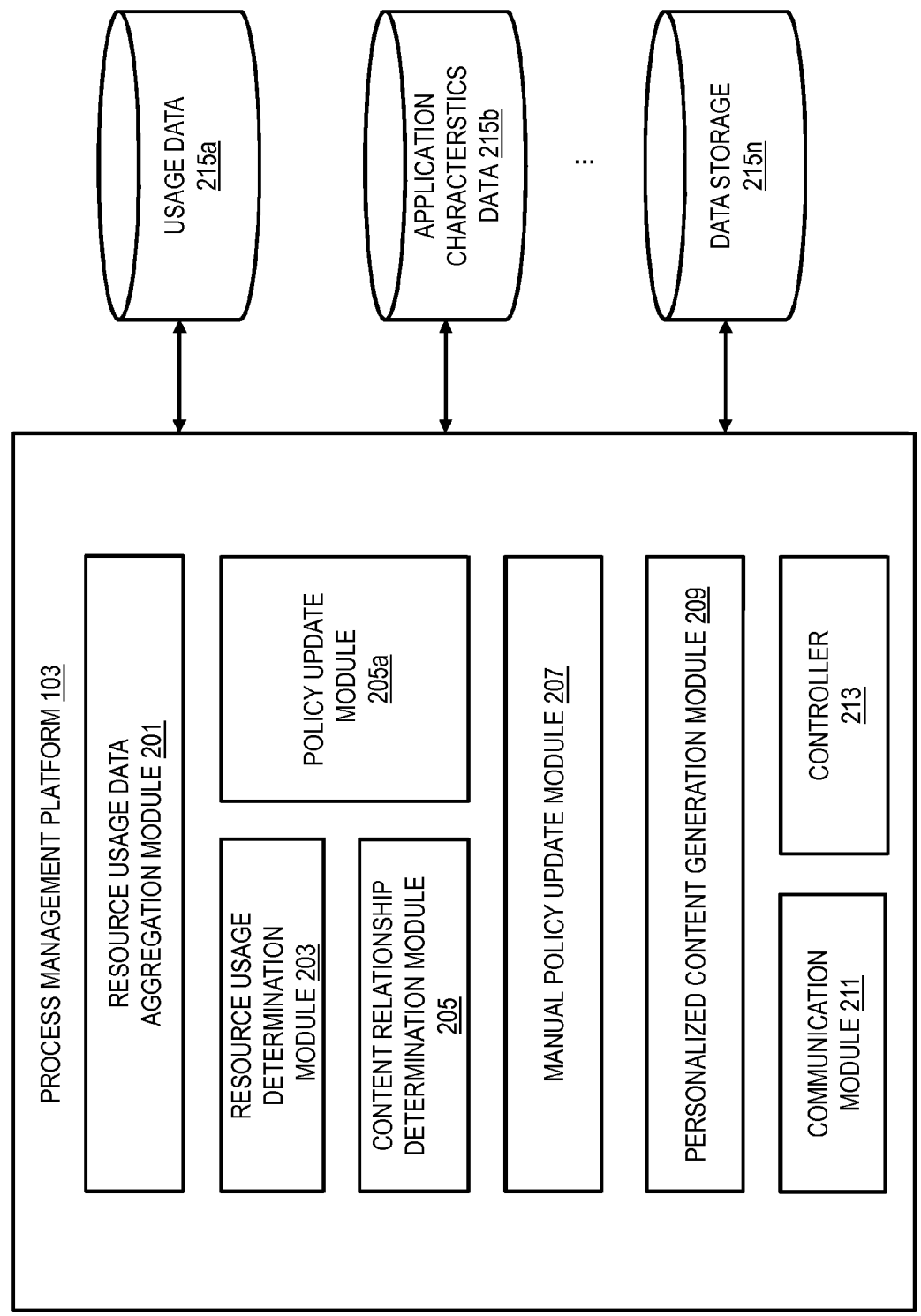
FIG. 2 is a diagram of the components of a process management platform, according to one embodiment.

FIG. 2 is a diagram of a process management platform, according to one embodiment. By way of example, the process management platform 103 includes one or more components for maintaining and analyzing user device usage information as it is generated by one or more user equipment (e.g., wireless communication devices, Smartphones, mobile phones). In addition, one or more components are included for enabling processes of the various UEs 101a-101n to be effectively managed to optimize their performance. It is contemplated that the functions of these components may be combined in one or more components or performed by other components of equivalent functionality. In one embodiment, the process management platform 103 includes a resource usage data aggregation module 201, a resource usage determination module 203, a content relationship determination module 205, a manual policy update module 207, a personalized content generation module 209, a communication module 211 and a controller 213. The controller 213 oversees tasks performed by the components of the system, including facilitating data exchange and storage of context information through use of various data storage devices 109a-109n and regulation of its own interactions with the other components 203-211.

In one embodiment, the resource usage data aggregation module 201 receives information about user equipment and/or associated web application. This information is relayed to the resource usage data aggregation module 201 by respective process monitor modules 105c of UEs 101a-101n, and includes information regarding the functional, operation or statistical state of the UE 101 or web applications operable thereon. As mentioned previously, the process management platform 103, via the resource usage data aggregation module 201, can interact with process monitor modules 105c of respective UEs 101a-101n on a periodic basis (e.g., once per day) for receiving such data. The interaction can also be performed during the course of normal communication between the process management platform 103 and the process monitor modules 105c as a "piggyback" process. By way of example, usage data is piggybacked or packaged along with data exchanged with the process management platform 103 during a routine diagnostic, regular system status check or other communication session. Upon receipt, the resource usage data aggregation module 201 can compile the data in a usage data database 215a or other data storage 215n, where current information can be aggregated with historical information of the same type.

It is noted that the data aggregated by module 201 may be organized for historical recollection, real-time analysis or other means of interpretation for determining specific usage and operational characteristics of differing UE 101 or applications. In one embodiment, this operation is performed by the resource usage determination module 203. By way of example, the resource usage determination module 203 analyzes the usage data 215a and determines the usage trends, commonalities and other characteristics that define the different UE 101a-101n and web applications. By way of example, the resource usage determination module 203 processes the data in accordance with a developed data model that attempts to characterize the behaviour of a given web application relative to a specific moment of use, may employ various statistics or metrics for specifying the usage of differing UEs, etc. It is noted that, once the UE 101 base has grown over some threshold, there will be information about the vast majority of used web-applications. As such, the resource usage determination module 203 may rely on this vast amount data for better qualifying, characterizing or determining how resources are used by respective UEs 101a-101n or applications.

In one embodiment, a content relationship determination module 205 determines the relationship between varying types of content as accessed from a particular content platform 113 via a web application of a given UE 101. By way of example, the content relationship determination module 205 may be configured to browse the content 115a-115n as accessed by a given application in a methodical, automated manner or in an orderly fashion. A technique for analyzing the content by module 205 may include URL normalization or canonicalization, which refers to the process of modifying and standardizing a URL for various content in a consistent manner (e.g., to determine content source commonality).

Under this approach, it is possible for the module 205 to determine if sites featuring content 115a-115n that appears to be non-related based on their domain (e.g. www.content_source.fi and www.content_source.com) are related to the same organization/individual, which in turn, makes them related. Another technique employed by the content relationship determination module 205 may include path ascendency analysis, wherein the commonality between various links between content is analyzed; or content revisitation analysis, where the amount of time content is actively browsed, its relevancy or the frequency of access of content 115 by the application is analyzed. Still further, the content relationship determination module 205 allows content relative to various web applications to be categorized based on various criteria, such as importance, origin, relational affinity, complexity and required permissions. It is noted that the content relationship determination module 205 may be employed or implemented using known web crawler architectures. Moreover, it is noted the content relationship determination module 205 may be implemented or accessed as a third party web tool for performing automated content crawling.

The content relationship determination module 205 is useful for providing additional detail regarding the various UEs and web applications. By way of example, determining the relationship between different sets of content 115a-115n may be used for further recognizing application or UE 101 usage respective to the execution of different content. This process may be performed in conjunction with the resource usage determination module 203. Having generated usage data 215a and determined the relationship between respective content 115a-115n, this information can be compiled by a policy update module 205a of the process management platform 103 into application characteristic data 215b. In certain instances, the policy update module 205a may generate or adapt the data 215b based on one or more data models or schemas, such as maintained in storage 215n.

In one embodiment, a manual policy update module 207 also enables the generation or adaptation of usage data 215a. By way of example, the manual policy update module 207 allows for the input of usage data 215a that cannot be automatically determined by the resource usage determination module 203 or informed by the content relationship determination module 205. For example, a manual policy may call for URLs of core applications (as designated by a user) to be listed, so that the UE 101 can run each core application in its own process regardless of its domain information. As another example, a manually entered policy may be provided for enabling a certain process allocation policy on per site or a per content basis. It is noted the process management platform 103 accommodates both manual and automated generation of application characteristic data.

In one embodiment, a personalized content generation module 209 combines the information generated by the above described modules 203-207 to produce user-specific personalized web application content. User-specific content as generated contains information about major web-sites and sites visited by the user recently. In addition, the user-specific content is comprised of much smaller amounts of information than content pertaining to web sites from all users. As such, this content is less tasking on the resources of the UE 101. It is noted that while the above described processes are presented with respect to the activities of the process management platform 103, certain implementations contemplate execution of these processes at both the UE 101 and process management platform 103 or just the UE 101.

In one embodiment, the various protocols, data sharing techniques and the like required for enabling collaborative execution between UEs 101a-101n over the communication network is provided by way of a communication module 209. As the various UEs 101a-101n may feature different communication means, the communication module 209 allows the process management platform 103 to adapt to these needs respective to the required protocols of the communication network 105. In addition, the communication module 211 may appropriately package data for effective receipt by a respective UE 101a-101n. By way of example, the communication module 211 packages the application characteristic data 215b as generated by the policy update module 205a or user-customized content as generated by the personalized content generation module 209 for transmission to respective UEs.

It is noted that application characteristic data is generated or maintained by respective UE 101a-101n as well as the process management platform 103. In an effort to maintain a level of synchronicity of policy data between the various UE 101a-101n and process management platform 103, an update process is performed as described before. As a general update mechanism, application characteristic data 215b maintained by the process management platform 103 may be downloaded by UE 101a-101n for inclusion with its current data set 109b. By way of this approach, the dataset 109b maintained by a single UE 101 may account for and be informed of application characteristic data for all UEs 101a-101n configured over the network 105. This makes for a more robust application characteristic dataset for execution at respective UE 101. It is noted therefore, that process migration and management may be performed differently in each UE 101a-101n due to variations in user preferences and application use while also accounting for known operating conditions of various UEs 101.

As a further means of ensuring proper synchronization of application characteristic data amongst respective UEs 101 and the process management platform 103, the policy data is generated and defined according to a common data framework. FIG. 3A is a diagram of a data structure representative of application characteristic data for enabling execution of applications within a user device, according to one embodiment. As mentioned, the application characteristic data 109a is stored to the UE 101 and updated as necessary, using application characteristic data maintained by the process management platform 103. This update process is facilitated by the process management module 105b and process monitor module 105c as described. Data structure 300 ensures the integrity of the dataset maintained at a respective client (e.g., UE 101) while enabling the overriding of certain data received from the server (e.g., process management platform 103).

By way of example, data structure 300 may include an application identifier 301 for specifying a particular application (e.g., application URL), permissions settings 303 as required by the application, a complexity indicator 305 or ranking for specifying the extent of processing complexity required by the application, a relational indicator 307 for specifying other applications of the UE that are related to the specified application for enabling execution of tasks and/or processes, an application usage frequency 309 for indicating how often the application is used and an application importance 311 for ranking the importance of the application relative to other related applications or processes at hand to be performed. Other data items may also be defined by the data structure 300 accordingly.

The permissions settings data 303 is used to indicate and determine whether certain content (e.g., specific web site) is allowed to access certain data or functionality (e.g., GPS sensor, camera, file system) on the UE 101. Generally, this data is user-specific, as one UE 101 may allow a site "www.somesite.com" to access its GPS sensor data while another UE 101 may be configured to deny this capability. It is noted that website permissions settings may be used to set the permissions of an OS process when the process management module 105b creates or allocated a new process. By way of example, the allocated process can never increase its set of permissions even in situations where the application in the process can be hijacked and made malicious. The permissions settings 303 as originally granted thus limits the damage a malicious application can have on the UE 101.

The complexity indicator 305 may be established based on numerous criteria, including an average application loading, processing or completion time; typical resource usage required for the application and other factors. This data may be informed by the process management platform 103 which compiles data for a plurality of UE 101a-101n.

Of the various application characteristics defined by the data structure 300, permissions settings 303, complexity indicator 305 and the relational indicator 307 may be overridden by the process management platform 103. This is because data elements 303, 305 and 307 are common for (or generalized with respect to) all UE 101a-101n configured at a given time to the process management platform 103. Hence, during the application characteristic data update process, a respective UE 101 may update this data with that provided by the process management platform 103 accordingly. However, usage frequency 309 and application ranking 311 are user/UE 101 specific criteria that pertain only to a single UE 101. Consequently, during the update process this data is not overridden by the process management platform 103. It is noted that in addition to the above described application characteristic data 109a of data structure 300, some characteristics that affect process allocation decisions need not be stored. Rather, they are runtime characteristics that are observed by the process management module 105b or process monitor module 105c, i.e., current RAM usage by an application.

In one embodiment, the application characteristics may include: (1) one or more security properties (e.g., the security features that are used by the application such as type of encryption, public key infrastructure, and the like); (2) one or more authentication properties (e.g., the policies for authenticating access to the application or its functions such as username/passwords, biometric identification, etc.); (3) one or more permissions (e.g., the resources of the device or other components to which the application has or seeks access); (4) frequency of use (e.g., how often is the application executed and/or used at the device); (5) importance (e.g., does the application relate to core functions of the device); or a combination thereof.

FIG. 3B is a diagram of a data structure representative of process allocation logic for enabling execution of applications within a user device, according to one embodiment. The process allocation logic is data representative of policies to be applied by a UE 101 based on the compiled application characteristic data of data structure 300. By way of example, data structure 312 may include a policy number 313 for referencing a specific policy, a policy name that provides a general description of the policy 315 to be applied, associated policy execution logic 317 for describing the logical rules and executions to be applied given a set of determined conditions, a priority setting 319 for specifying the level of importance of a policy relative to others, and application data 321 for indicating the applications to be impacted through execution of the policies. Other data items may also be defined by the data structure 312 accordingly.

The priority setting of a given policy is based generally upon a wide set of usage factors, content relationship factors and other data as compiled and/or generated by the process management platform 103 for a plurality of UE 101a-101n. As an example, when a given UE 101 is associated with a particular wireless communication service provider (that maintains a process management platform 103), the priority setting is assigned according to the determined usage, relationship and other characteristics of all UEs associated with the provider. Hence, the process management platform 103 sets the priority 319, via the policy update module 205a, so as to rank policy management approaches that are best suited for the various UEs 101 configured for communication with the process management platform 103. It is noted that execution of a policy by the process management module 105b is performed in consideration of the application importance ranking 311 as assigned to a specific application.

It is further noted that application data 321 indicates one or more application identifiers (IDs) that are to be associated with a specific policy. As indicated with respect to FIG. 3A, each application ID is also defined according to various other characteristics pertaining to its use, execution and relevancy with respect to a given UE 101. By way of this commonality, application characteristic data 300 may be associated with specific process allocation logic data 312 to be executed for the application. It is noted that system 100 enables the management and subsequent execution of processes within UE 101 on the basis of individual and/or real-time device conditions and needs, and also best practices for devices in general.

The data structure 300 may be implemented according to various known data formats and conventions. Likewise, the execution logic 305 as specified within the data structure may be implemented in accordance with any programming language or syntax that facilitates web based execution. This includes extensible markup language (XML), JScript, various .NET protocols (e.g., ASP.NET), Simple Object Access Protocol (SOAP) and the like. As an example, the policy execution 305 is conforms to the expression 313, wherein IF a condition is determined (e.g., two applications share a common trust domain), THEN a specific logical operation is performed (e.g., consolidate and run the applications in the same process), OTHERWISE perform a different logical operation (e.g., run the applications in separate processes).

In certain embodiments, the process management module 105b processes the data structure 300 to enact the specified policy executions 305. Process allocation policies may be implemented as one or more algorithms or approaches (as named below) as follows:

Common Domain Name Grouping: The initial algorithm for grouping applications in operation on the UE 101 can be based on the domain name associated with accessed content 115. Applications whose top-level domain and the domain immediately below the top-level—referred to as the trust domain—are determined to be related and run in the same process. By way of example, the following are all run in the same process by the process management module 105b:
http://content_source.net/apps/contacts/index.html
http://content_source.net/utils/log/index.html
http://content_source.net/tools/mem/index.html
However, the following are allocated to separate processes:
http://www.some_url.com
http://apps.somedomain.com/game/index.html Complexity or Relevancy Based Allocation Policies:
Web applications that are complex are run in their own process;

Web applications that are simple and related are run in the same process;

A determined core application is run in its own process;

Major web sites for which the required permission set is listed in the policy: correct permission set for the process can be set immediately, even if the user has not previously started this web application Web applications that are simple and require the same set of permissions may be run in the same process Process Monitor Based Allocation Policies:

Do not start a complex web application, if RAM memory is not sufficient (inform user);

Consolidate applications to a single process that are determined to be idle or inactive beyond a specific period of time Running Application Based Allocation Policies:

When a certain system total random access memory (RAM) usage limit is achieved (e.g., because existing applications have increased their memory usage or because new applications have been started), the process management module 105b notifies the current non-core applications running in their own processes to suspend. The process management module 105b then waits for the applications to store their state, kills the processes, and restarts the applications in the same process. Execution of this approach reduces RAM usage and overhead;

When RAM usage of a process running several applications grows to a certain predetermined limit, the policy management module 105b allocates the applications to different processes (e.g., application migration) to increase robustness of the UE 101.

It is noted that the above described operations, in general, are intended to minimize user required intervention for managing and allocating processes. By way of example, the various approaches of the process management module 105b are performed seamlessly, such that no noticeable changes are incurred to running web applications, browser windows, tabs, etc. In certain instances, however, a suitable notification is presented to the display of the UE 101 when required to enable process allocation.

Figure 4B:
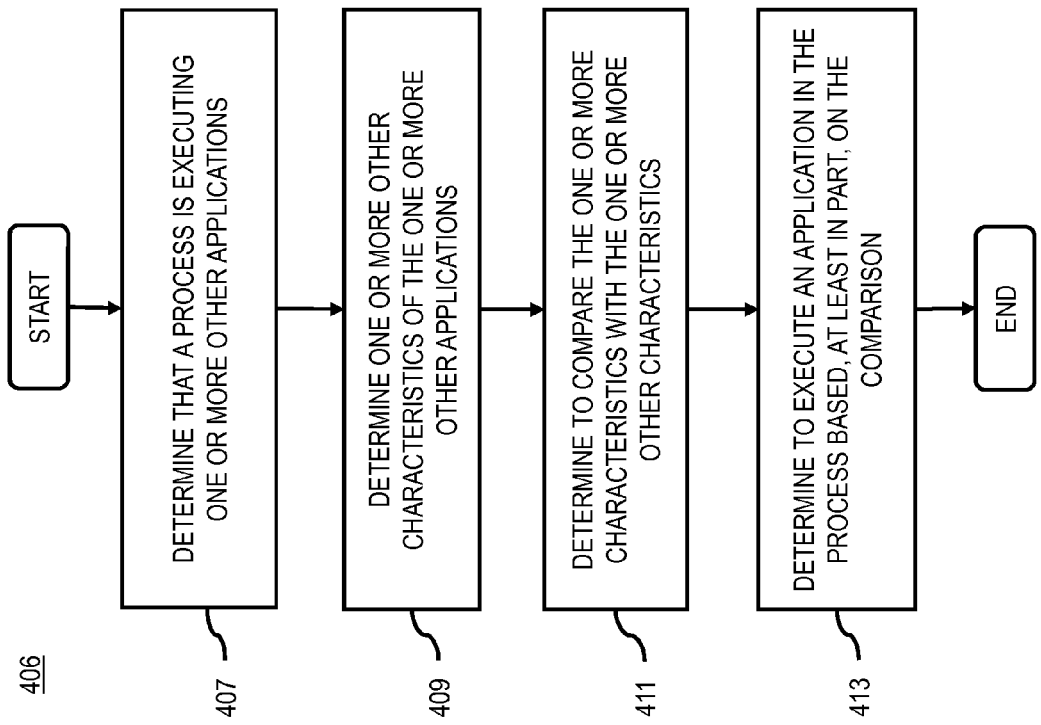
FIGS. 4A and 4B are flowcharts of processes for enabling execution of applications within a user device, according to various embodiments.
Figure 4A:
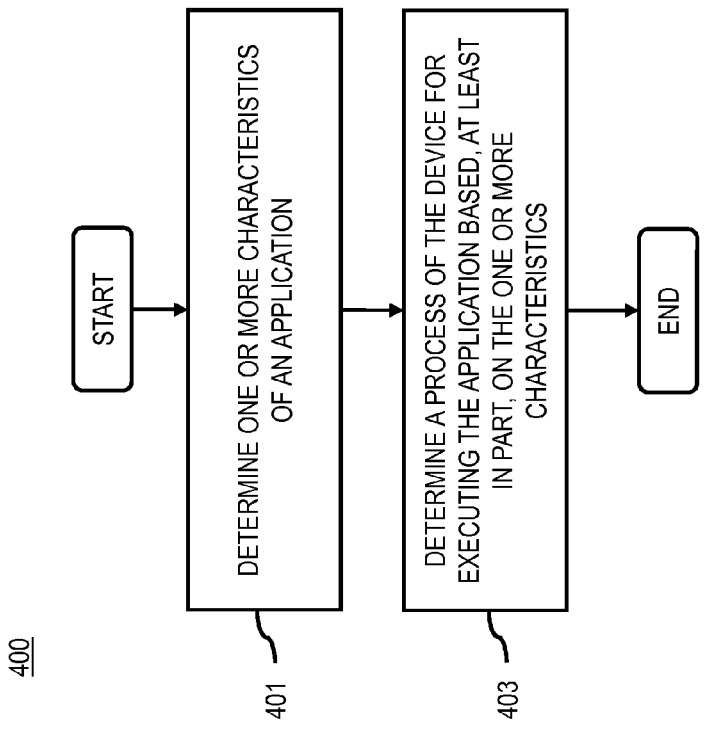

FIGS. 4A and 4B are flowcharts of processes for enabling execution of applications within a user device, according to various embodiments. For the purpose of illustration, processes 400 and 406 are described with respect to FIG. 1. It is noted that the steps of the process may be performed in any suitable order, as well as combined or separated in any suitable manner. Process 400 pertains to steps performed by the various modules of the UE 101. In step 401 of process 400, one or more characteristics of an application are determined by the process monitor module 105c. As mentioned previously, the process monitor module 105c gathers information about the state of the UE 101 operating system and running web applications. This information may be compiled and analyzed for characterizing the UE 101 or applications running thereon. In another step 403, the process management module utilizes the determined characteristics of the application to determine a process for executing the application.

Figure 5A:
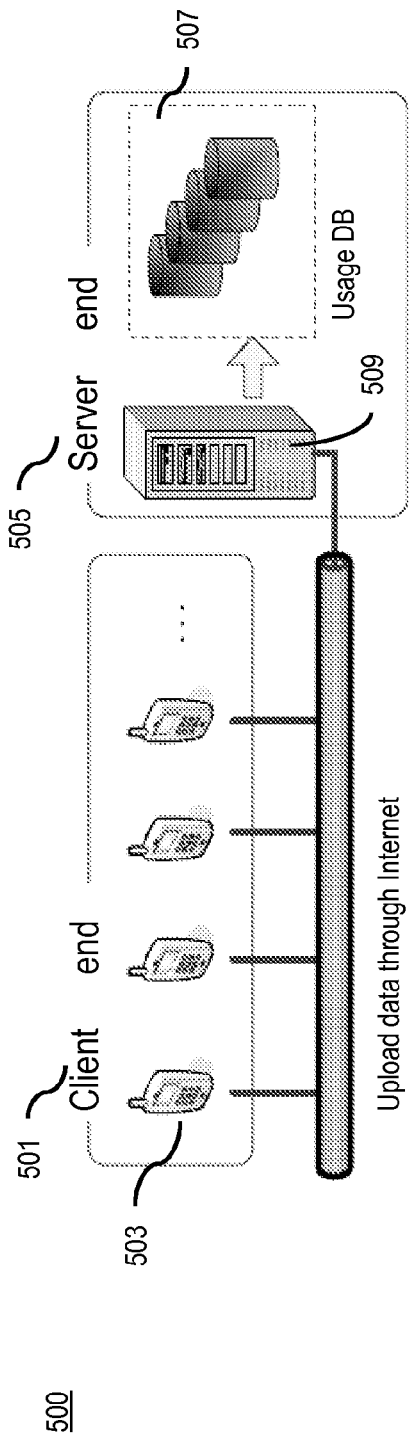
FIGS. 5A and 5B are diagrams of interactions between a client and a server utilized in data mining included in the processes of FIGS. 3A and 3B, according to various embodiments.
Figure 5B:
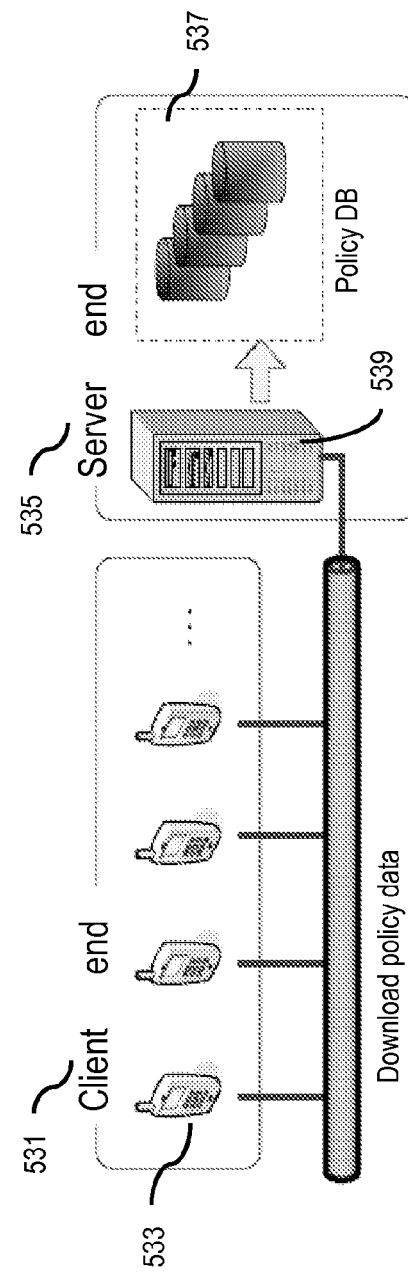

Process 406 also pertains to steps performed by the UE 101. In step 407 of process 406, the process monitor module 105c determines that a process of a particular UE 101 is executing one or more other applications. In step 409, the process monitor module also determines one or more other characteristics of the one or more other applications. Based on this information, the process management module 105b performs additional analysis, including determining to compare the one or more characteristics with the one or more other characteristics (step 411). This enables the process management platform 103 to detect variations in resource usage or process allocation accordingly for enabling process allocation decisions. As such, in yet another step 413, it is determined to execute an application in the process based on the comparison. FIGS. 5A and 5B are diagrams of interactions between a client and a server utilized in data mining included in the processes of FIGS. 4A and 4B, according to various embodiments. FIG. 5A shows that data such as resource usage data monitored at the client end 501 from mobile devices 503 (e.g., UEs 101a-101n), may be uploaded to the server end 505 through the Internet (e.g., communication network 105). In one embodiment, the server end 505 may include the process management platform 103. At the server end 505, the uploaded data is stored in the usage database 215a. Once the uploaded data is processed by the server, i.e., after data mining and personalization, it can then be downloaded to the client. This embodiment is advantageous in that the mobile devices 503 can reduce their computational burdens associated with the data mining to the server 509. It is noted that the server 509 generally has more processing power and related resources (e.g., bandwidth, memory, etc.) than the mobile devices 503 to handle this type of computation.

Alternatively, as shown in FIG. 5B, the data retrieved (downloaded) by the mobile devices 533 at the client end 531 may be stored at storage media (not shown) of the respective mobile devices 533. The mobile devices 533 may then locally perform the computations for generating application characteristic data 109a. Then, the result of the computation (e.g., the client-end application characteristic data) may be uploaded to the server end 535 including a server 539 and application characteristic database 537. This embodiment is advantageous in that the data is kept within the respective mobile devices 533, and is not uploaded to other devices or servers without the user's permission. As long as the mobile device 533 has the data and sufficient processing power to analyze the data, then the server 539 may not be required to perform the analysis.

It is noted that the techniques and procedures presented herein enable an optimized allocation of processes for enabling the execution of web applications. In addition, system 100 presents various policies for establishing logical executions to be performed respective to determined device or application conditions. In certain embodiments, the process management platform also pertains to management of processes related to web phone applications. As used herein, "web phone" applications pertain to items such as contacts, calendar, gallery and email, which are implemented using web technologies (e.g., HTML, cascading style sheets (CSS), Java Script). With web phone applications, each application is effectively a secure web site, which has wide access to device functionality, such as connectivity, GPS location, camera, etc. All third party applications are also web sites identifiable by a URL. With a web phone based application, the process allocation mechanism employed by the process management module 105b enables a more robust and effective execution experience for the user.

The processes described herein for managing processes for enabling execution of applications within a user device may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 6:
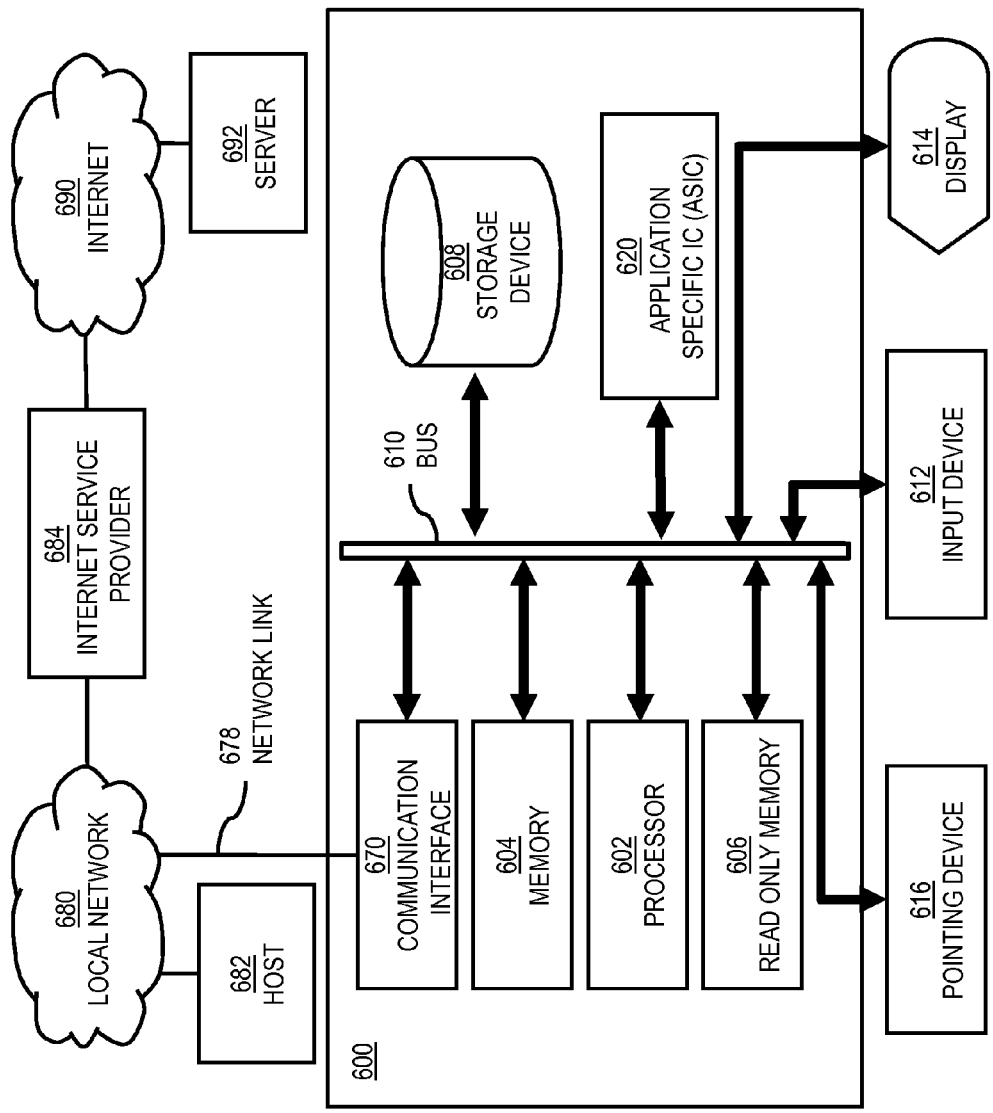
FIG. 6 is a diagram of hardware that can be used to implement an embodiment of the invention.

FIG. 6 illustrates a computer system 600 upon which an embodiment of the invention may be implemented. Although computer system 600 is depicted with respect to a particular device or equipment, it is contemplated that other devices or equipment (e.g., network elements, servers, etc.) within FIG. 6 can deploy the illustrated hardware and components of system 600. Computer system 600 is programmed (e.g., via computer program code or instructions) to manage processes for enabling execution of applications within a user device as described herein and includes a communication mechanism such as a bus 610 for passing information between other internal and external components of the computer system 600. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 600, or a portion thereof, constitutes a means for performing one or more steps of managing processes for enabling execution of applications within a user device.

A bus 610 includes one or more parallel conductors of information so that information is transferred quickly among devices coupled to the bus 610. One or more processors 602 for processing information are coupled with the bus 610.

A processor (or multiple processors) 602 performs a set of operations on information as specified by computer program code related to manage processes for enabling execution of applications within a user device. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 610 and placing information on the bus 610. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 602, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 600 also includes a memory 604 coupled to bus 610. The memory 604, such as a random access memory (RAM) or any other dynamic storage device, stores information including processor instructions for managing processes for enabling execution of applications within a user device. Dynamic memory allows information stored therein to be changed by the computer system 600. RAM allows a unit of information stored at a location called a memory address to be stored and retrieved independently of information at neighboring addresses. The memory 604 is also used by the processor 602 to store temporary values during execution of processor instructions. The computer system 600 also includes a read only memory (ROM) 606 or any other static storage device coupled to the bus 610 for storing static information, including instructions, that is not changed by the computer system 600. Some memory is composed of volatile storage that loses the information stored thereon when power is lost. Also coupled to bus 610 is a non-volatile (persistent) storage device 608, such as a magnetic disk, optical disk or flash card, for storing information, including instructions, that persists even when the computer system 600 is turned off or otherwise loses power.

Information, including instructions for managing processes for enabling execution of applications within a user device, is provided to the bus 610 for use by the processor from an external input device 612, such as a keyboard containing alphanumeric keys operated by a human user, or a sensor. A sensor detects conditions in its vicinity and transforms those detections into physical expression compatible with the measurable phenomenon used to represent information in computer system 600. Other external devices coupled to bus 610, used primarily for interacting with humans, include a display device 614, such as a cathode ray tube (CRT), a liquid crystal display (LCD), a light emitting diode (LED) display, an organic LED (OLED) display, a plasma screen, or a printer for presenting text or images, and a pointing device 616, such as a mouse, a trackball, cursor direction keys, or a motion sensor, for controlling a position of a small cursor image presented on the display 614 and issuing commands associated with graphical elements presented on the display 614. In some embodiments, for example, in embodiments in which the computer system 600 performs all functions automatically without human input, one or more of external input device 612, display device 614 and pointing device 616 is omitted.

In the illustrated embodiment, special purpose hardware, such as an application specific integrated circuit (ASIC) 620, is coupled to bus 610. The special purpose hardware is configured to perform operations not performed by processor 602 quickly enough for special purposes. Examples of ASICs include graphics accelerator cards for generating images for display 614, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 600 also includes one or more instances of a communications interface 670 coupled to bus 610. Communication interface 670 provides a one-way or two-way communication coupling to a variety of external devices that operate with their own processors, such as printers, scanners and external disks. In general the coupling is with a network link 678 that is connected to a local network 680 to which a variety of external devices with their own processors are connected. For example, communication interface 670 may be a parallel port or a serial port or a universal serial bus (USB) port on a personal computer. In some embodiments, communications interface 670 is an integrated services digital network (ISDN) card or a digital subscriber line (DSL) card or a telephone modem that provides an information communication connection to a corresponding type of telephone line. In some embodiments, a communication interface 670 is a cable modem that converts signals on bus 610 into signals for a communication connection over a coaxial cable or into optical signals for a communication connection over a fiber optic cable. As another example, communications interface 670 may be a local area network (LAN) card to provide a data communication connection to a compatible LAN, such as Ethernet. Wireless links may also be implemented. For wireless links, the communications interface 670 sends or receives or both sends and receives electrical, acoustic or electromagnetic signals, including infrared and optical signals, that carry information streams, such as digital data. For example, in wireless handheld devices, such as mobile telephones like cell phones, the communications interface 670 includes a radio band electromagnetic transmitter and receiver called a radio transceiver. In certain embodiments, the communications interface 670 enables connection to the communication network 105 for managing processes for enabling execution of applications within a user device to the UE 101.

The term "computer-readable medium" as used herein refers to any medium that participates in providing information to processor 602, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 608. Volatile media include, for example, dynamic memory 604. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 620.

Network link 678 typically provides information communication using transmission media through one or more networks to other devices that use or process the information. For example, network link 678 may provide a connection through local network 680 to a host computer 682 or to equipment 684 operated by an Internet Service Provider (ISP). ISP equipment 684 in turn provides data communication services through the public, world-wide packet-switching communication network of networks now commonly referred to as the Internet 690.

A computer called a server host 692 connected to the Internet hosts a process that provides a service in response to information received over the Internet. For example, server host 692 hosts a process that provides information representing video data for presentation at display 614. It is contemplated that the components of system 600 can be deployed in various configurations within other computer systems, e.g., host 682 and server 692.

At least some embodiments of the invention are related to the use of computer system 600 for implementing some or all of the techniques described herein. According to one embodiment of the invention, those techniques are performed by computer system 600 in response to processor 602 executing one or more sequences of one or more processor instructions contained in memory 604. Such instructions, also called computer instructions, software and program code, may be read into memory 604 from another computer-readable medium such as storage device 608 or network link 678. Execution of the sequences of instructions contained in memory 604 causes processor 602 to perform one or more of the method steps described herein. In alternative embodiments, hardware, such as ASIC 620, may be used in place of or in combination with software to implement the invention. Thus, embodiments of the invention are not limited to any specific combination of hardware and software, unless otherwise explicitly stated herein.

The signals transmitted over network link 678 and other networks through communications interface 670, carry information to and from computer system 600. Computer system 600 can send and receive information, including program code, through the networks 680, 690 among others, through network link 678 and communications interface 670. In an example using the Internet 690, a server host 692 transmits program code for a particular application, requested by a message sent from computer 600, through Internet 690, ISP equipment 684, local network 680 and communications interface 670. The received code may be executed by processor 602 as it is received, or may be stored in memory 604 or in storage device 608 or any other non-volatile storage for later execution, or both. In this manner, computer system 600 may obtain application program code in the form of signals on a carrier wave.

Various forms of computer readable media may be involved in carrying one or more sequence of instructions or data or both to processor 602 for execution. For example, instructions and data may initially be carried on a magnetic disk of a remote computer such as host 682. The remote computer loads the instructions and data into its dynamic memory and sends the instructions and data over a telephone line using a modem. A modem local to the computer system 600 receives the instructions and data on a telephone line and uses an infra-red transmitter to convert the instructions and data to a signal on an infra-red carrier wave serving as the network link 678. An infrared detector serving as communications interface 670 receives the instructions and data carried in the infrared signal and places information representing the instructions and data onto bus 610. Bus 610 carries the information to memory 604 from which processor 602 retrieves and executes the instructions using some of the data sent with the instructions. The instructions and data received in memory 604 may optionally be stored on storage device 608, either before or after execution by the processor 602.

Figure 7:
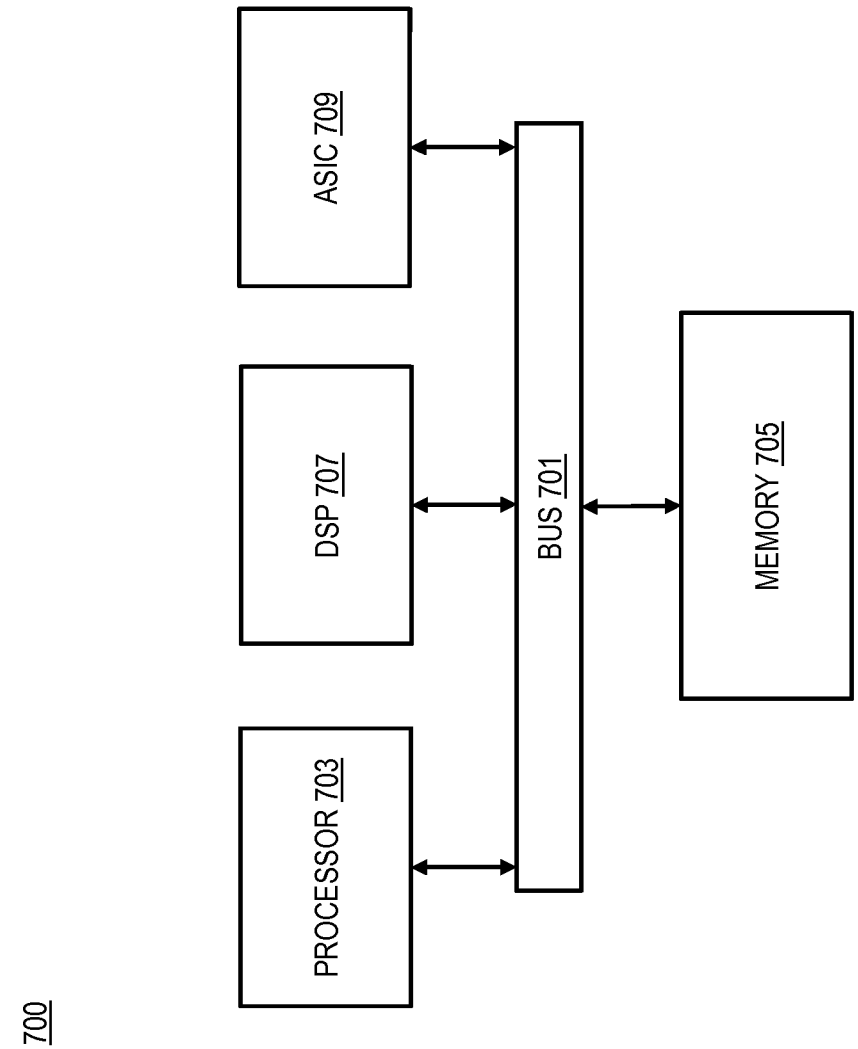
FIG. 7 is a diagram of a chip set that can be used to implement an embodiment of the invention.

FIG. 7 illustrates a chip set or chip 700 upon which an embodiment of the invention may be implemented. Chip set 700 is programmed to manage processes for enabling execution of applications within a user device as described herein and includes, for instance, the processor and memory components described with respect to FIG. 6 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 700 can be implemented in a single chip. It is further contemplated that in certain embodiments the chip set or chip 700 can be implemented as a single "system on a chip." It is further contemplated that in certain embodiments a separate ASIC would not be used, for example, and that all relevant functions as disclosed herein would be performed by a processor or processors. Chip set or chip 700, or a portion thereof, constitutes a means for performing one or more steps of providing user interface navigation information associated with the availability of functions. Chip set or chip 700, or a portion thereof, constitutes a means for performing one or more steps of managing processes for enabling execution of applications within a user device.

In one embodiment, the chip set or chip 700 includes a communication mechanism such as a bus 701 for passing information among the components of the chip set 700. A processor 703 has connectivity to the bus 701 to execute instructions and process information stored in, for example, a memory 705. The processor 703 may include one or more processing cores with each core configured to perform independently. A multi-core processor enables multiprocessing within a single physical package. Examples of a multi-core processor include two, four, eight, or greater numbers of processing cores. Alternatively or in addition, the processor 703 may include one or more microprocessors configured in tandem via the bus 701 to enable independent execution of instructions, pipelining, and multithreading. The processor 703 may also be accompanied with one or more specialized components to perform certain processing functions and tasks such as one or more digital signal processors (DSP) 707, or one or more application-specific integrated circuits (ASIC) 709. A DSP 707 typically is configured to process real-world signals (e.g., sound) in real time independently of the processor 703. Similarly, an ASIC 709 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 700 includes merely one or more processors and some software and/or firmware supporting and/or relating to and/or for the one or more processors.

The processor 703 and accompanying components have connectivity to the memory 705 via the bus 701. The memory 705 includes both dynamic memory (e.g., RAM, magnetic disk, writable optical disk, etc.) and static memory (e.g., ROM, CD-ROM, etc.) for storing executable instructions that when executed perform the inventive steps described herein to manage processes for enabling execution of applications within a user device. The memory 705 also stores the data associated with or generated by the execution of the inventive steps.

Figure 8:
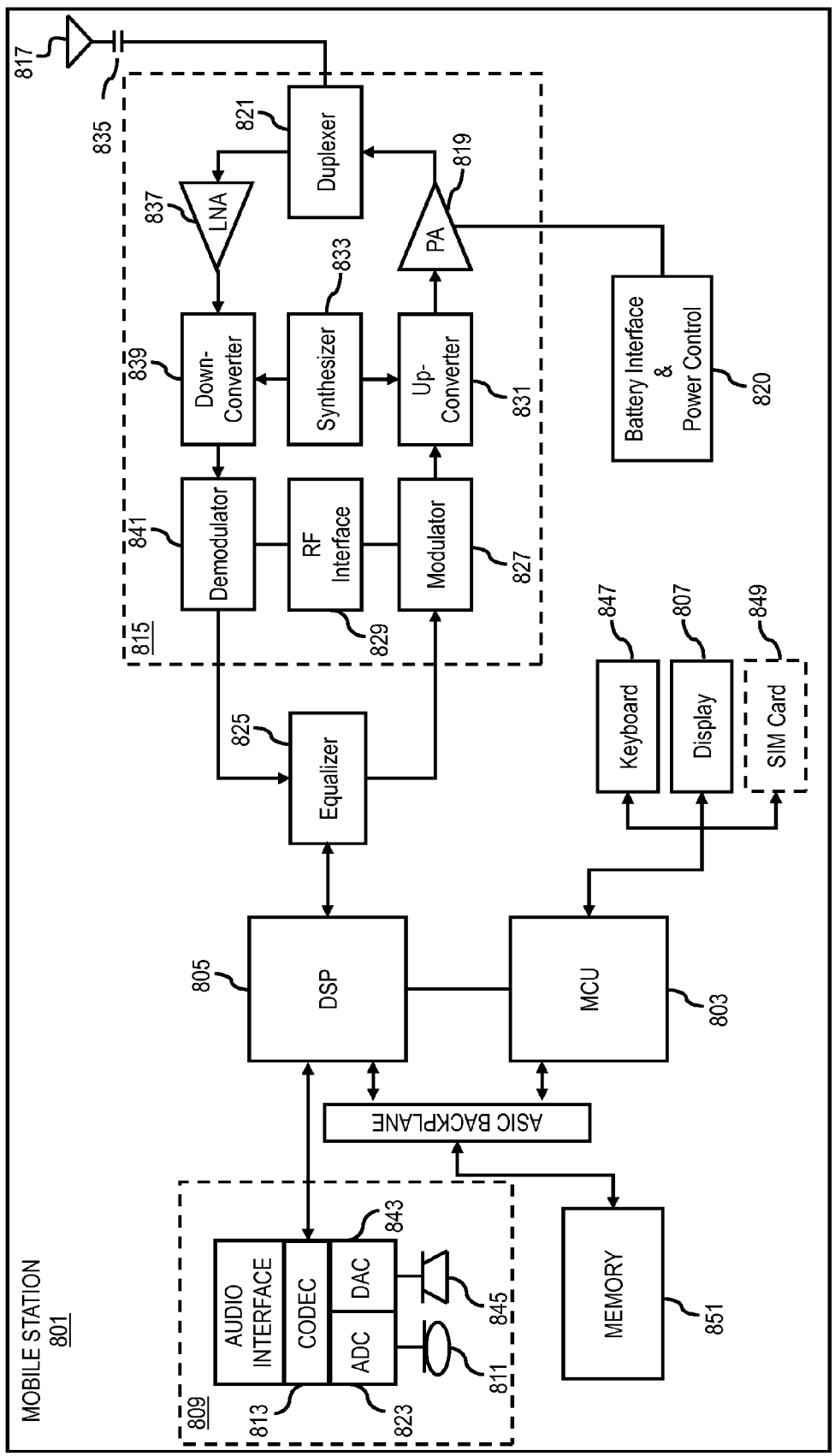
FIG. 8 is a diagram of a mobile terminal (e.g., handset) that can be used to implement an embodiment of the invention.

FIG. 8 is a diagram of exemplary components of a mobile terminal (e.g., handset) for communications, which is capable of operating in the system of FIG. 1, according to one embodiment. In some embodiments, mobile terminal 801, or a portion thereof, constitutes a means for performing one or more steps of managing processes for enabling execution of applications within a user device. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 803, a Digital Signal Processor (DSP) 805, and a receiver/transmitter unit including a microphone gain control unit and a speaker gain control unit. A main display unit 807 provides a display to the user in support of various applications and mobile terminal functions that perform or support the steps of managing processes for enabling execution of applications within a user device. The display 807 includes display circuitry configured to display at least a portion of a user interface of the mobile terminal (e.g., mobile telephone). Additionally, the display 807 and display circuitry are configured to facilitate user control of at least some functions of the mobile terminal. An audio function circuitry 809 includes a microphone 811 and microphone amplifier that amplifies the speech signal output from the microphone 811. The amplified speech signal output from the microphone 811 is fed to a coder/decoder (CODEC) 813.

A radio section 815 amplifies power and converts frequency in order to communicate with a base station, which is included in a mobile communication system, via antenna 817. The power amplifier (PA) 819 and the transmitter/modulation circuitry are operationally responsive to the MCU 803, with an output from the PA 819 coupled to the duplexer 821 or circulator or antenna switch, as known in the art. The PA 819 also couples to a battery interface and power control unit 820.

In use, a user of mobile terminal 801 speaks into the microphone 811 and his or her voice along with any detected background noise is converted into an analog voltage. The analog voltage is then converted into a digital signal through the Analog to Digital Converter (ADC) 823. The control unit 803 routes the digital signal into the DSP 805 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 825 for compensation of any frequency-dependent impairments that occur during transmission though the air such as phase and amplitude distortion. After equalizing the bit stream, the modulator 827 combines the signal with a RF signal generated in the RF interface 829. The modulator 827 generates a sine wave by way of frequency or phase modulation. In order to prepare the signal for transmission, an up-converter 831 combines the sine wave output from the modulator 827 with another sine wave generated by a synthesizer 833 to achieve the desired frequency of transmission. The signal is then sent through a PA 819 to increase the signal to an appropriate power level. In practical systems, the PA 819 acts as a variable gain amplifier whose gain is controlled by the DSP 805 from information received from a network base station. The signal is then filtered within the duplexer 821 and optionally sent to an antenna coupler 835 to match impedances to provide maximum power transfer. Finally, the signal is transmitted via antenna 817 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 801 are received via antenna 817 and immediately amplified by a low noise amplifier (LNA) 837. A down-converter 839 lowers the carrier frequency while the demodulator 841 strips away the RF leaving only a digital bit stream. The signal then goes through the equalizer 825 and is processed by the DSP 805. A Digital to Analog Converter (DAC) 843 converts the signal and the resulting output is transmitted to the user through the speaker 845, all under control of a Main Control Unit (MCU) 803 which can be implemented as a Central Processing Unit (CPU) (not shown).

The MCU 803 receives various signals including input signals from the keyboard 847. The keyboard 847 and/or the MCU 803 in combination with other user input components (e.g., the microphone 811) comprise a user interface circuitry for managing user input. The MCU 803 runs a user interface software to facilitate user control of at least some functions of the mobile terminal 801 to manage processes for enabling execution of applications within a user device. The MCU 803 also delivers a display command and a switch command to the display 807 and to the speech output switching controller, respectively. Further, the MCU 803 exchanges information with the DSP 805 and can access an optionally incorporated SIM card 849 and a memory 851. In addition, the MCU 803 executes various control functions required of the terminal. The DSP 805 may, depending upon the implementation, perform any of a variety of conventional digital processing functions on the voice signals. Additionally, DSP 805 determines the background noise level of the local environment from the signals detected by microphone 811 and sets the gain of microphone 811 to a level selected to compensate for the natural tendency of the user of the mobile terminal 801.

The CODEC 813 includes the ADC 823 and DAC 843. The memory 851 stores various data including call incoming tone data and is capable of storing other data including music data received via, e.g., the global Internet. The software module could reside in RAM memory, flash memory, registers, or any other form of writable storage medium known in the art. The memory device 851 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 849 carries, for instance, important information, such as the cellular phone number, the carrier supplying service, subscription details, and security information. The SIM card 849 serves primarily to identify the mobile terminal 801 on a radio network. The card 849 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   determining, at a processor, one or more characteristics of an application executable by a user device, wherein the one or more characteristics include one or more security properties, one or more authentication properties, one or more permissions, frequency of use, resources used, importance, or a combination thereof, wherein the one or more characteristics is based, at least in part, on historical information collected during previous executions of the application, wherein at least one characteristic comprises resources used in response to execution of the application;
   determining if the application is executing for the first time on the user device,
   allocating a separate process to execute the application in response to determining that the application is executing for the first time;
   in response to determining that the application is not executing for the first time:
      determining a process allocation policy associated with the application wherein the process allocation policy is updated based on the historical information collected during previous executions of the application;
      determining a process of the user device for executing the application based, at least in part, on the one or more characteristics and the process allocation policy;
      determining that the process for executing the application is executing one or more other applications;
      determining one or more other characteristics of the one or more other applications;
      comparing the one or more characteristics with the one or more other characteristics; and
      determining to execute the application in the process based, at least in part, on a match found in the comparison.

2. A method of claim 1, further comprising:
   determining resource information associated with the user device,
   wherein the determining of the process for executing the application is further based, at least in part, on the resource information.

3. A method of claim 1, wherein the determining of the process occurs on an initiation of the application or during an execution of the application.

4. A method of claim 1, wherein the application executes in an interpreted code environment of the user device.

5. A method of claim 1, wherein the application is a web application.

6. A method of claim 5, wherein the one or characteristics are determined from a server associated with the web application, the user device, the application, or a combination thereof.

7. A method of claim 1, further comprising:
 determining if the application executable by the user device is related to an existing application having one or more characteristics and a process allocation policy; and
 using at least one of the one or more characteristics or the process allocation policy of the existing application to determine one or more characteristics of the application executable by the user device or the process allocation policy for the application executable by the user device.

8. An apparatus comprising:
 at least one processor; and
 at least one memory including computer program code for one or more programs,
 the at least one memory and the computer program code configured to, with the at least one processor, cause the apparatus to perform at least the following:
 determine one or more characteristics of an application executable by a user device, wherein the one or more characteristics include one or more security properties, one or more authentication properties, one or more permissions, frequency of use, resources used, importance, or a combination thereof, wherein the one or more characteristics is based, at least in part, on historical information collected during previous executions of the application, wherein at least one characteristic comprises resources used in response to execution of the application;
 determine a process allocation policy associated with the application wherein the process allocation policy is updated based on the historical information collected during previous executions of the application;
 determine if the application is executing for the first time on the user device,
 allocate a separate process to execute the application in response to determining that the application is executing for the first time;
 in response to determining the application is not executing for the first time:
  determine a process of the device for executing the application based, at least in part, on the one or more characteristics and the process allocation policy;
  determine that the process for executing the application is executing one or more other applications;
  determine one or more other characteristics of the one or more other applications;
  compare the one or more characteristics with the one or more other characteristics; and
  determine to execute the application in the process based, at least in part, on a match found in the comparison.

9. An apparatus of claim 8, wherein the apparatus is further caused to:
 determine resource information associated with the user device,
 wherein the determining of the process for executing the application is further based, at least in part, on the resource information.

10. An apparatus of claim 8, wherein the determining of the process occurs on an initiation of the application or during an execution of the application.

11. An apparatus of claim 8, wherein the application executes in an interpreted code environment of the user device.

12. An apparatus of claim 8, wherein the application is a web application.

13. An apparatus of claim 12, wherein the one or characteristics are determined from a server associated with the web application, the user device, the application, or a combination thereof.

14. An apparatus of claim 8, wherein the apparatus is further caused to:
 determine if the application executable by the user device is related to an existing application having one or more characteristics and a process allocation policy; and
 use at least one of the one or more characteristics or the process allocation policy of the existing application to determine one or more characteristics of the application executable by the user device or the process allocation policy for the application executable by the user device.

\* \* \* \* \*